United States Patent [19]

Kwan

[11] Patent Number: 5,627,820
[45] Date of Patent: May 6, 1997

[54] AUTOMATIC DETECTION OF A TELECOMMUNICATIONS FRACTIONAL CHANNEL

[75] Inventor: Michael D. Kwan, Colorado Springs, Colo.

[73] Assignee: Hewlett-Packard Company, Palo Alto, Calif.

[21] Appl. No.: 548,164

[22] Filed: Oct. 25, 1995

[51] Int. Cl.$^6$ ........................................................ H04J 3/14
[52] U.S. Cl. ........................ 370/252; 370/433; 375/224; 375/260
[58] Field of Search ................... 370/13, 79, 80, 370/85.7, 112, 114; 375/224, 225, 260

[56] References Cited

U.S. PATENT DOCUMENTS 5,065,396  11/1991  Castellano et al. .................... 370/112
5,311,456  5/1994   Chiang et al. ....................... 364/715.11
5,457,715  10/1995  Sakaki et al. ........................ 375/260

*Primary Examiner*—Benedict. V. Safourek
*Attorney, Agent, or Firm*—Augustus W. Winfield

[57] ABSTRACT

A method of detecting fractional channels in a telecommunications circuit. A non-idle data rate is measured for each channel in the telecommunications circuit. Channels having matching non-idle data rates are grouped into sets. Non-idle data rates are measured again for the channels within each set. In each set, any channels having non-matching non-idle data rates (with a small predetermined range of permissible variability) are eliminated. The measurement for each set is repeated multiple times. Each remaining set has channels that have substantially identical non-idle data rates over multiple time periods and each remaining set is assumed to constitute a fractional channel. Non-idle data rates are measured by counting non-idle octets over a fixed period of time, or by measuring throughput (non-idle octets per second) or by measuring utilization (throughput/capacity).

4 Claims, 3 Drawing Sheets

AUTOMATIC DETECTION OF A TELECOMMUNICATIONS FRACTIONAL CHANNEL

FIELD OF INVENTION

This invention relates generally to digital telephony and more specifically to detection of configuration information that is useful for instrumentation used for telecommunications problem diagnosis and performance monitoring.

BACKGROUND OF THE INVENTION

Digital transmission systems typically carry multiple time division multiplexed channels. For example, the T-1 (or T1) system commonly used in the U.S. and Canada can handle 24 simultaneous voice conversations (or data equivalents). The European counterpart (E-1 or E1) can carry 31 channels. Although digital telecommunications lines may be used for any digital data, the basic specifications originate from the requirements for digitized voice. Digitization of analog voice requires 8,000 samples per second to satisfy the Nyquist criteria of twice the highest voice frequency of 4,000 Hz. Coding each sample into 8-bits (called octets in the telecommunication industry) results in the fundamental digital voice channel rate of 64 kbps (thousand bits per second). As a result, for T1 and E1 digital telephone circuits, each channel has a bandwidth of 64 kbps, formatted as 8,000 octets per second. Multiple channels can be concatenated together to form a single higher-rate channel referred to as a fractional T1 (or E1) channel. For example, two channels can be combined to make a single 128 kbps channel. In general, during troubleshooting or performance monitoring, which channels and how many channels are combined to make these fractional channels may not be known. There is a need for automatic determination of how many fractional channels exist on a circuit and which channels are combined into each fractional channel.

SUMMARY OF THE INVENTION

The non-idle data ram for each channel is analyzed. Successive multiple measurements are analyzed. Channels that make up a fractional channel have matching non-idle data rates, within a small error, over successive multiple measurements. Channels having matching non-idle data rates are grouped into sets. Non-idle data rates are measured multiple times for the channels within each set. In each set, any channels having non-matching non-idle data rates (with a small predetermined range of permissible variability) are eliminated. Each remaining set having at least two channels that have substantially identical non-idle data rates over multiple time periods is assumed to constitute a fractional channel. Non-idle data rates may be measured by counting octets, throughput, utilization or other similar measurements.

DETAILED DESCRIPTION OF THE PREFERRED EMBODIMENT OF THE INVENTION

Figure 1A:
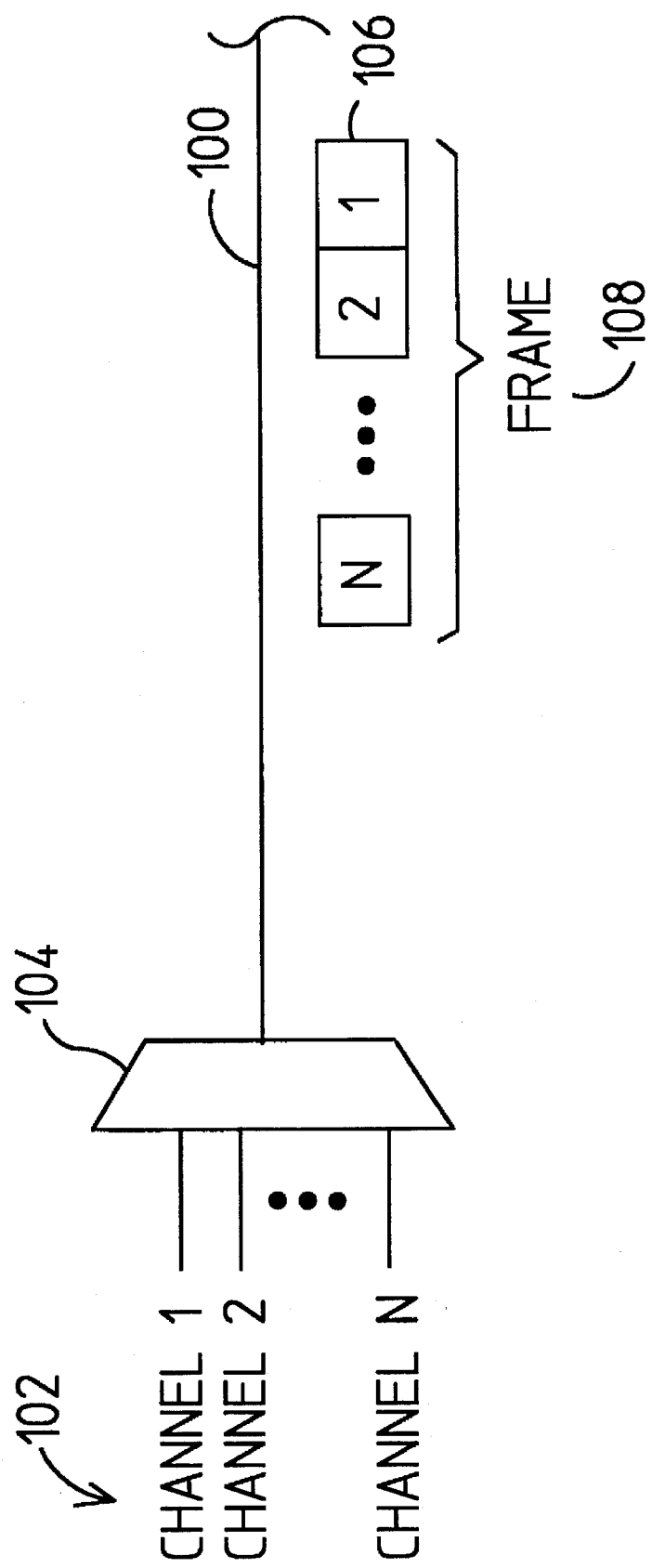
FIG. 1A is a block diagram of a multiple channel digital telecommunications circuit.

FIG. 1A is a block diagram of a digital time division multiplexed telecommunication circuit. A transmission line 100 serially carries N channels 102 of dam. Each channel 102 is multiplexed by multiplexer 104. A sample from one channel is an octet 106. N octets constitute a frame 108. The frame rate for T1 and E1 circuits is 8,000 frames per second, each frame carrying one octet per channel, each channel therefore having a bandwidth of 8,000 octets per second.

Figure 1B:
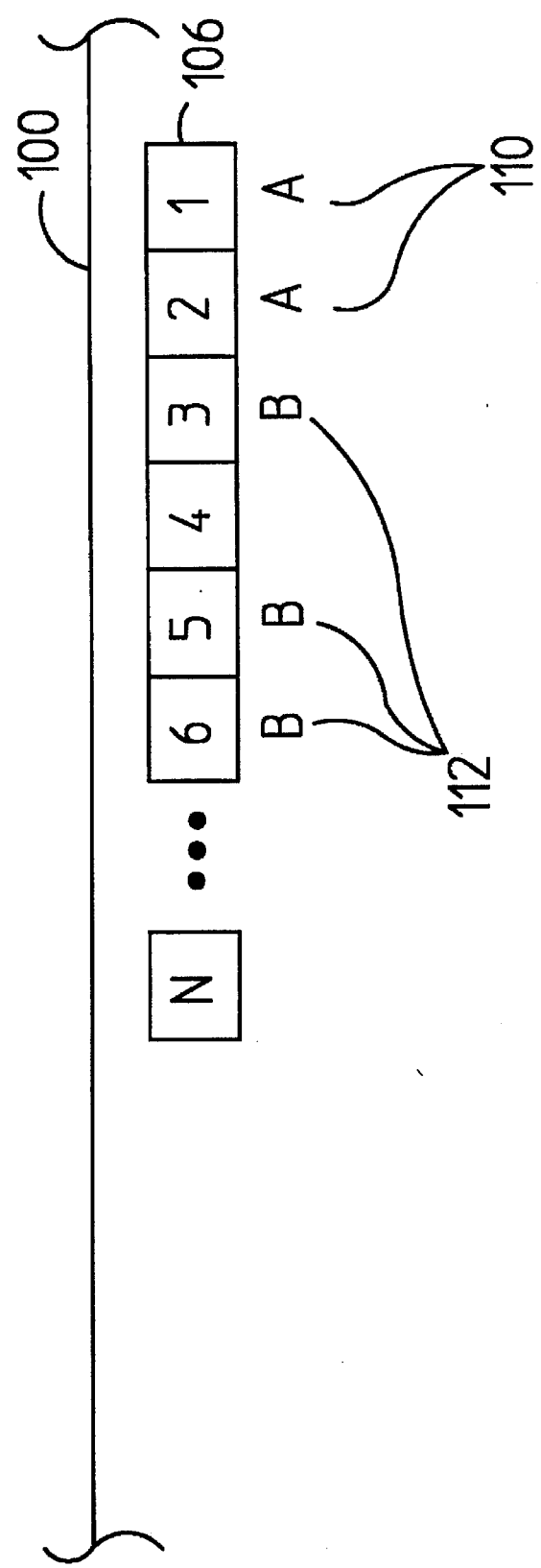
FIG. 1B is the circuit of FIG. 1A with multiple fractional circuits.

FIG. 1B illustrates the transmission line 100 of FIG. 1A and octets 106 with some octets logically combined into higher speed channels. The numbers in the octets 106 represent channel numbers as depicted by reference number 102 in FIG. 1A. The letters below the octets designate fractional (or high speed) channels. Channels 1 and 2 are combined to form fractional channel A with a bandwidth of 128 kbps. Channels 3, 5 and 6 are combined to form fractional channel B with a bandwidth of 192 kbps. Note that channels forming a fractional channel are not necessarily contiguous. In general, a person monitoring transmission line 100 may not know that channels 1 and 2 are combined and that channels 3, 5 and 6 are combined. This information is necessary for troubleshooting and analysis of fractional channels.

Typically, a channel or fractional channel is not used continuously. There will be bursts of activity separated by idle periods. There is a standard 8-bit pattern for an octet signifying that a channel is idle. In general, non-idle activity varies with time. Within the set of channels in a fractional channel, however, non-idle activity varies substantially identically over time for every channel in the set. Therefore, a way to determine if channels are combined is to examine statistics for non-idle activity of each channel over time and determine which channels have substantially identical statistics over time.

Figure 2:
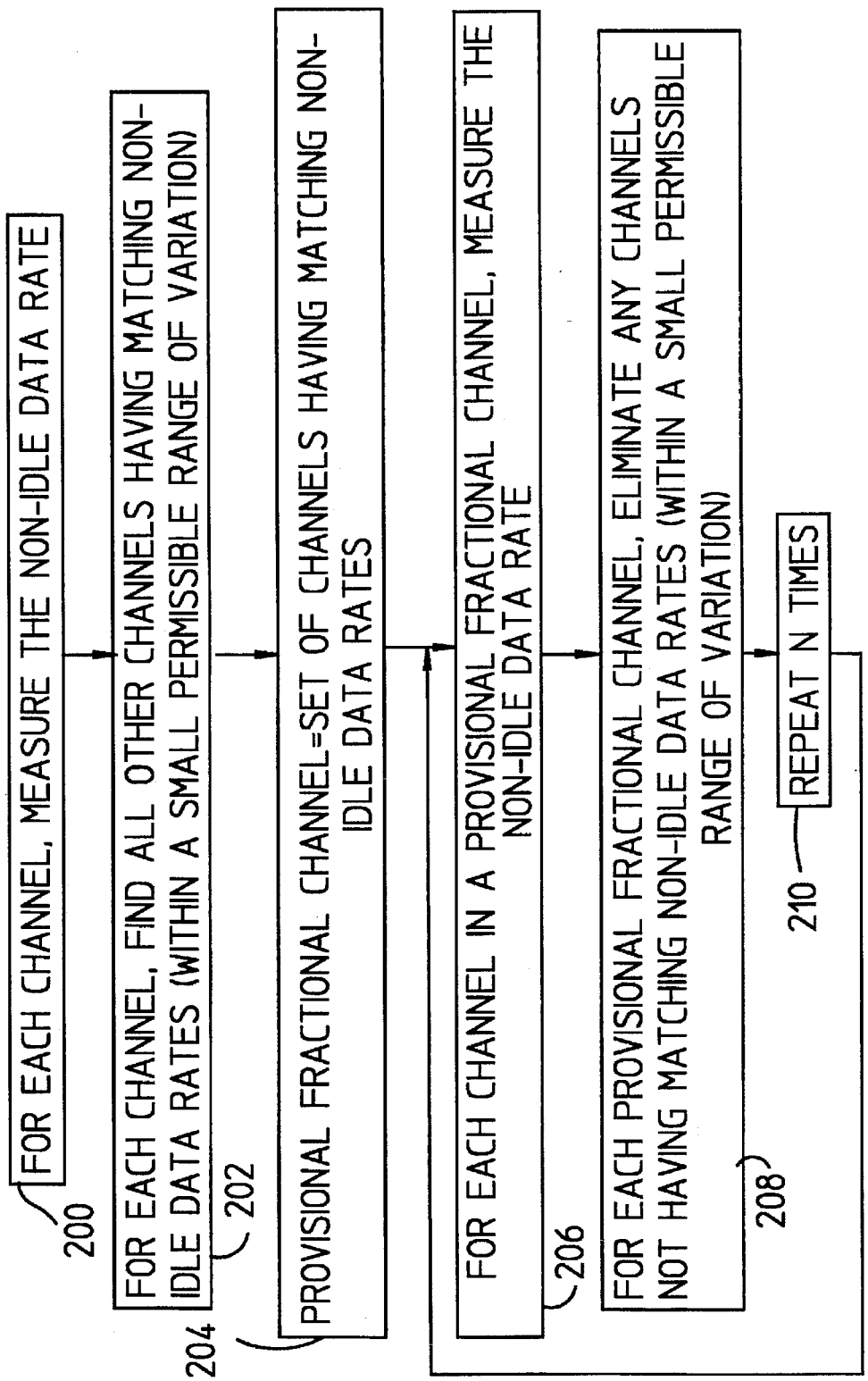
FIG. 2 is a flow chart of the method used to determine channel configuration.

FIG. 2 is a flow chart illustrating an embodiment of a method in accordance with the invention. First, in step 200, the non-idle data rate for each channel is computed. In step 202, the non-idle data rate for each channel is compared to the non-idle data rate for every other channel. Channels having the same non-idle data rate, plus or minus a small permissible variation, are grouped into sets (step 204). Each set is provisionally a fractional channel, subject to further refinement over time. During each iteration of steps 206–210, non-idle data rates are measured for each channel within each provisional fractional channel. In step 208, within each provisional fractional channel, any channels not having the same non-idle data rate, plus or minus a small permissible variation, are eliminated from the set. After N iterations of steps 206–210, each provisional fractional channel having more than one channel remaining has a set of channels that have had matching non-idle data rates during N different time intervals. Therefore, each remaining provisional channel having at least two channels is assumed to constitute a fractional channel.

In a specific application, non-idle octets are counted over a fixed time interval. The fixed time interval is one second, N is ten, and the permissible variation is plus or minus 25 counts. Alternative related non-idle data rate measurements may be used depending on what is normally provided by instrumentation. For example, an instrument may measure throughput (octets per second) which may or may not require a fixed period of time. Alternatively, an instrument may measure utilization (throughput/capacity) expressed as a percentage. Note that any one of (a) counts over a fixed time interval, (b) throughput and (c) utilization may be calculated from any of the other related measurements.

The foregoing description of the present invention has been presented for purposes of illustration and description.

It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for detecting a fractional channel in a telecommunications circuit, the method comprising the following steps:

(a) measuring a non-idle data rate for each channel in the telecommunications circuit;

(b) grouping channels having the same non-idle data rate, within a fixed range of variation, into sets;

(c) measuring a non-idle data rate, for a particular set from step (b), for each channel in the particular set;

(d) eliminating from the particular set of step (c) any channel having a non-idle data rate that is not approximately the same as a non-idle data rate for the other channels in the particular set;

(e) repeating steps (c) and (d) for all sets from step (b);

(f) repeating steps (c), (d) and (e) multiple times; and (g) designating each remaining set having at least two channels as a fractional channel.

2. The method of claim 1 wherein measuring a non-idle data rate comprises counting non-idle octets for a fixed time interval.

3. The method of claim 1 wherein measuring a non-idle data rate comprises measuring throughput.

4. The method of claim 1 wherein measuring a non-idle data rate comprises measuring utilization.

* * * * *